United States Patent
Ponnuru et al.

(10) Patent No.: US 11,228,518 B2
(45) Date of Patent: Jan. 18, 2022

(54) SYSTEMS AND METHODS FOR EXTENDED SUPPORT OF DEPRECATED PRODUCTS

(71) Applicant: Dell Products, L.P., Round Rock, TX (US)

(72) Inventors: Viswanath Ponnuru, Bangalore (IN); Raveendra Babu Madala, Bangalore (IN); Vaideeswaran G, Bangalore (IN); Ramesha He, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 33 days.

(21) Appl. No.: 16/749,742

(22) Filed: Jan. 22, 2020

(65) Prior Publication Data

US 2021/0226876 A1 Jul. 22, 2021

(51) Int. Cl.
*H04L 12/26* (2006.01)
*H04L 12/24* (2006.01)
*G06F 8/65* (2018.01)
*G06F 8/71* (2018.01)

(52) U.S. Cl.
CPC ............ *H04L 43/0876* (2013.01); *G06F 8/65* (2013.01); *G06F 8/71* (2013.01); *H04L 41/5035* (2013.01); *H04L 43/16* (2013.01)

(58) Field of Classification Search
CPC . H04L 43/16; H04L 43/0876; H04L 41/5035; G06F 8/65; G06F 8/71
See application file for complete search history.

(56) References Cited

U.S. PATENT DOCUMENTS

| | | | | |
|---|---|---|---|---|
| 7,191,435 | B2* | 3/2007 | Lau | G06F 8/65 714/38.1 |
| 7,860,919 | B1* | 12/2010 | Patsenker | H04L 41/0803 709/201 |
| 8,005,803 | B2* | 8/2011 | Graefe | G06F 16/28 707/694 |
| 8,429,610 | B2* | 4/2013 | Clemm | G06F 8/71 717/122 |
| 9,348,585 | B2* | 5/2016 | Eliáš | G06F 8/75 |
| 9,652,493 | B1* | 5/2017 | King | G06F 8/61 |
| 9,886,262 | B2* | 2/2018 | Thomas | G06F 8/61 |
| 10,528,741 | B1* | 1/2020 | Collins | G06F 8/70 |
| 10,678,678 | B1* | 6/2020 | Tsoukalas | G06F 11/3664 |
| 10,834,141 | B1* | 11/2020 | Chud | H04L 63/10 |

(Continued)

*Primary Examiner* — James R Sheleheda
(74) *Attorney, Agent, or Firm* — Fogarty LLP

(57) ABSTRACT

Method and systems support management of deprecated components within a system of IHSs (Information Handling Systems), such as within a datacenter. Upon receiving notification of a deprecated component, instances of the deprecated component are identified within the datacenter. Usage information is collected for the deprecated component by remote access capabilities of the IHSs and by management capabilities of chassis in which the IHSs may be housed. Based on the collected usage information, usages are determined for individual features of the deprecated component. Even though a component has been deprecated, some features of the component may still be supported. Such supported features of the deprecated components are identified. Licenses may be provided for use of features that are that are supported and that are actually utilized, as determined from the usage information.

20 Claims, 3 Drawing Sheets

(56) References Cited

U.S. PATENT DOCUMENTS

| | | | |
|---|---|---|---|
| 2003/0191864 A1* | 10/2003 | Govindarajapuram ...................... G06F 9/4484 719/310 |
| 2006/0064490 A1* | 3/2006 | Huberman ............... H04L 67/22 | 709/226 |
| 2007/0083707 A1* | 4/2007 | Holland ................. G06F 3/0689 | 711/114 |
| 2009/0049288 A1* | 2/2009 | Weissman ................. G06F 8/71 | 712/245 |
| 2010/0299663 A1* | 11/2010 | Weissman ................. G06F 8/71 | 717/170 |
| 2012/0053922 A1* | 3/2012 | Twig .................. G06Q 10/0637 | 703/13 |
| 2012/0110093 A1* | 5/2012 | Tingstrom ............ G06F 16/219 | 709/206 |
| 2014/0033165 A1* | 1/2014 | Hightower ................ G06F 8/36 | 717/101 |
| 2016/0094483 A1* | 3/2016 | Johnston ................. H04L 67/10 | 709/226 |
| 2016/0140629 A1* | 5/2016 | Kallio ................. G06F 3/03547 | 705/400 |
| 2016/0182324 A1* | 6/2016 | Harishankar ......... G06F 9/5072 | 709/224 |
| 2016/0274893 A1* | 9/2016 | Thomas .............. G06F 9/44536 |
| 2018/0018464 A1* | 1/2018 | Tadic .................... G06F 21/577 |
| 2020/0110600 A1* | 4/2020 | Weldemariam ..... G06F 11/3604 |
| 2020/0134196 A1* | 4/2020 | Collins .................... G06F 21/51 |
| 2021/0226876 A1* | 7/2021 | Ponnuru .................... G06F 8/71 |

* cited by examiner

SYSTEMS AND METHODS FOR EXTENDED SUPPORT OF DEPRECATED PRODUCTS

FIELD

The present disclosure generally relates to Information Handling Systems (IHSs), and, more particularly, to the configuration of systems of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise blade servers that are stacked and installed within racks. A data center may include large numbers of such server racks that are organized into rows of racks. Administration of such large groups of IHSs may require teams of remote and local administrators working in shifts in order to support around-the-clock availability of the data center operations while minimizing any downtime. A data center may include a wide variety of hardware systems and software applications that may each be separately licensed and supported. Over time, individual hardware and software systems at use within a data center may become deprecated once those systems are no longer being supported.

SUMMARY

In various embodiments, methods are provided for managing the systems used within a data center comprised of a plurality of IHSs (Information Handling Systems). The methods may include: receiving a notification of a deprecated component; identifying instances of the deprecated component within the plurality of IHSs; collecting usage information for the deprecated component identified within the plurality of IHSs; based on the collected usage information for the deprecated component, determining a usage for a first feature of the deprecated component; and based on the usage of the identified first feature, determining whether the first feature of the deprecated component is supported.

In additional method embodiments, the usage information is identified by a remote access controller operating on respective IHSs of the plurality of IHSs. In additional method embodiments, wherein the deprecated components are hardware components and wherein the remote access controller collects the usage information by interfacing directly with the hardware components. In additional embodiments, methods may further include: receiving a risk level for the deprecated component; and supporting use of the first feature when the risk level for the deprecated component is above a risk threshold. In additional method embodiments, the first feature of the of the deprecated component is identified based on usage of the first feature above a utilization threshold. In additional method embodiments, the usage information is collected by a chassis management controller that manages a first portion of the plurality of IHSs that are housed within a first chassis. In additional method embodiments, the deprecated component comprises a component of the chassis that supports the first portion of the plurality of IHSs.

In various additional embodiments, remote access controllers are configured as a component of an IHS (Information Handling Systems) for managing the systems used by the IHS. The remote access controller may include: one or more processors; and a memory device coupled to the one or more processors, the memory device storing computer-readable instructions that, upon execution by the one or more processors, cause the remote access controller to: receive a notification of a deprecated component; identify an instance of the deprecated component within the IHS; collect usage information for the deprecated component identified within the IHS; based on the collected usage information for the deprecated component, determine a usage for a first feature of the deprecated component; based on the usage of the identified first feature, determine whether the first feature of the deprecated component is supported.

In additional remote access controller embodiments, the deprecated component comprises a first hardware component and wherein the remote access controller collects the usage information by a direct interface with the first hardware component. In additional remote access controller embodiments, the direct interface comprises an out-of-band signaling pathway between the remote access controller and the first hardware component. In additional remote access controller embodiments, the first feature of the of the deprecated component is identified based on usage of the first feature above a utilization threshold. In additional remote access controller embodiments, the first feature of the deprecated component comprises a storage operation. In additional remote access controller embodiments, the first feature of the deprecated component comprises a security protocol.

In various additional embodiments, a memory device coupled to one or more processor and storing computer-readable instructions that, upon execution by the one or more processors, cause the processors to: receive a notification of a deprecated component within a plurality of IHSs (Information Handling Systems); identify instances of the deprecated component within the plurality of IHSs; collect usage information for the instances of the deprecated component identified within the plurality of IHSs; based on the collected usage information for the deprecated component, determine a usage for a first feature of the deprecated component; and based on the usage of the identified first feature, determine whether the first feature of the deprecated component is supported.

In additional memory device embodiments, the usage information is identified by a remote access controller operating on each of the respective plurality of IHSs. In additional memory device embodiments, the deprecated component comprises a hardware component and wherein the remote access controller collects the usage information by a direct interface with the first hardware component. In additional memory device embodiments, the first feature of the of the deprecated component is identified based on usage of the first feature above a utilization threshold. In additional memory device embodiments, execution of the instructions further causes the processors to: receive a risk level for the deprecated component; and extend support for the first feature when the risk level for the deprecated component is above a risk threshold. In additional memory device embodiments, the usage information is identified by a chassis management controller that manages a first portion of the plurality of IHSs comprised within a first chassis. In additional memory device embodiments, the deprecated component comprises a component of the chassis that supports the first portion of the plurality of IHSs.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

As described, a data center may include a large number of IHSs that may be installed as components of a chassis. A rack may house several different chassis and a data center may include numerous racks. Accordingly, administrators face significant difficulties in assessing the impact of the deprecation of components within the data center. A data center may include a large number of licensed hardware and software systems. Upon deprecation, such data center hardware and software systems are no longer supported by their manufacturer, seller, re-seller or other entity that has been contracted to provide support. In some scenarios, a deprecated system may be rarely used, or only certain features of the deprecated system are actually used. Administrators may be unable to accurately assess the importance of a deprecated system or to identify scenarios where only certain features of a deprecated system are actually used. Embodiments provide capabilities for determining the importance of a deprecated system base in part upon measured use of the deprecated system. These capabilities support identification of situations where only a portion of the individual features of a deprecated system are actually used. IHSs according to embodiments may be configured to collect data used in identifying such situations. Collected usage information may then be used to identify scenarios where features of deprecated system that are identified as being used may be otherwise supported.

Figure 1:
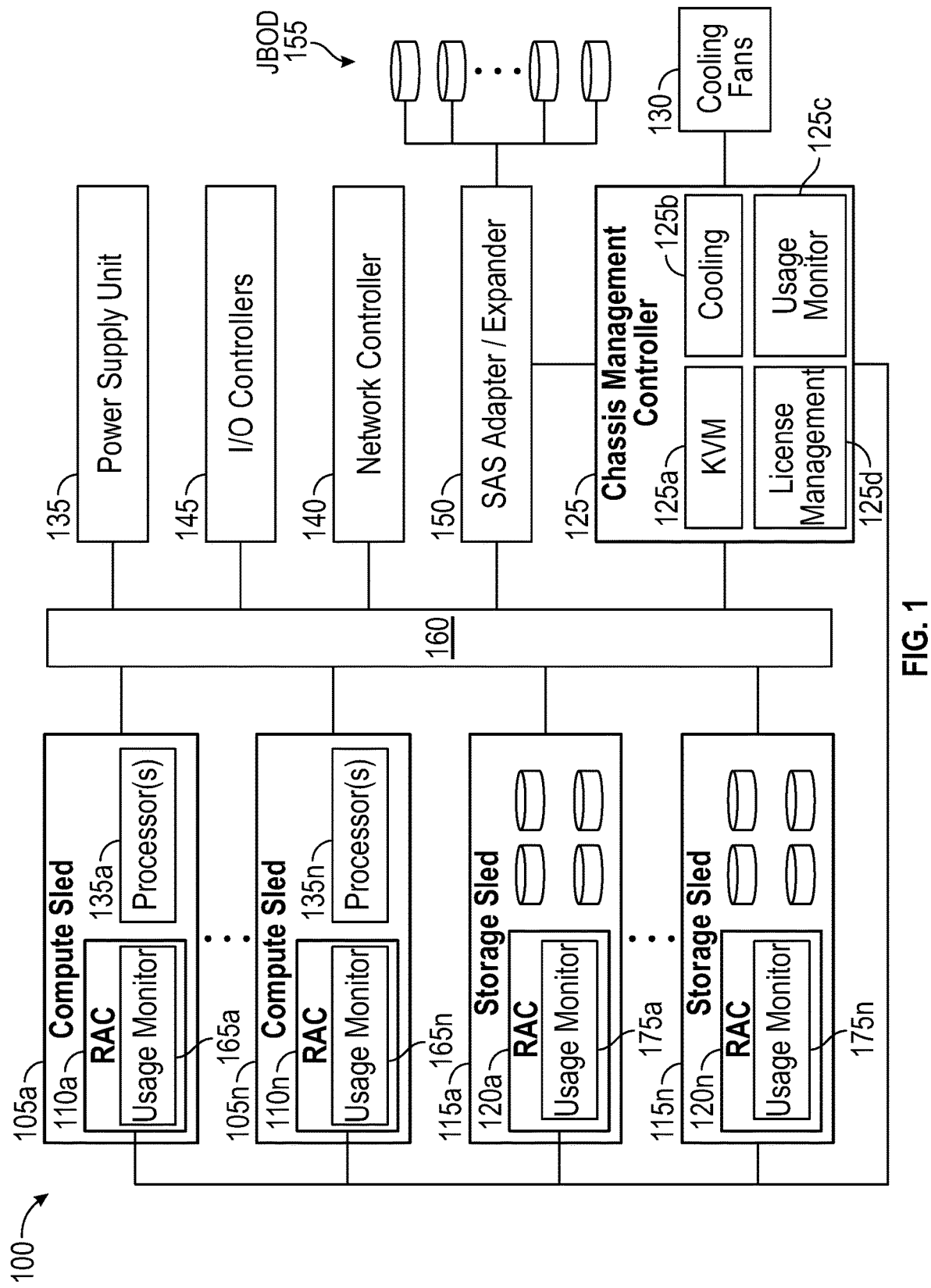
FIG. 1 is a block diagram illustrating certain components of a chassis supporting a plurality of IHSs and configured according to various embodiments for extended support of deprecated hardware and software systems of the chassis.

FIG. 1 is a block diagram illustrating certain components of a chassis 100 comprising one or more compute sleds 105a-n and one or more storage sleds 115a-n that may be configured to implement the systems and methods described herein. As described in additional detail below, each of the sleds 105a-n, 115a-n may be separately licensed hardware components and each of the sleds may also operate using a variety of licensed hardware and software features. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

By configuring a chassis 100 with different sleds, the chassis may be adapted to support specific types of operations, thus providing a computing solution directed towards a specific type of computational task. For instance, a chassis 100 that is configured to support artificial intelligence computing solutions may include additional compute sleds, compute sleds that include additional processors, and/or compute sleds that include specialized artificial intelligence processors or other specialized artificial intelligence components, such as specialized FPGAs. In another example, a chassis 100 configured to support specific data mining operations may include network controllers 140 that support high-speed couplings with other similarly configured chassis, thus supporting high-throughput, parallel-processing computing solutions. In another example, a chassis 100 configured to support certain database operations may be configured with specific types of storage sleds 115a-n that provide increased storage space or that utilize adaptations that support optimized performance for specific types of databases. In other scenarios, a chassis 100 may be configured to support specific enterprise applications, such as by utilizing compute sleds 105a-n and storage sleds 115a-n that include additional memory resources that support simultaneous use of enterprise applications by multiple remote users. In another example, a chassis 100 may include compute sleds 105a-n and storage sleds 115a-n that support secure and isolated execution spaces for specific types of virtualized environments. In some instances, specific combinations of sleds may comprise a computing solution, such as an artificial intelligence system, that may be licensed and supported as a computing solution.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and the storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. In some embodiments, components installed on a motherboard backplane 160 may include components that implement all or part of the functions described with regard to components such as the SAS (Serial Attached SCSI) expander 150, I/O controllers 145, network controller 140 and power supply unit 135.

Figure 2:
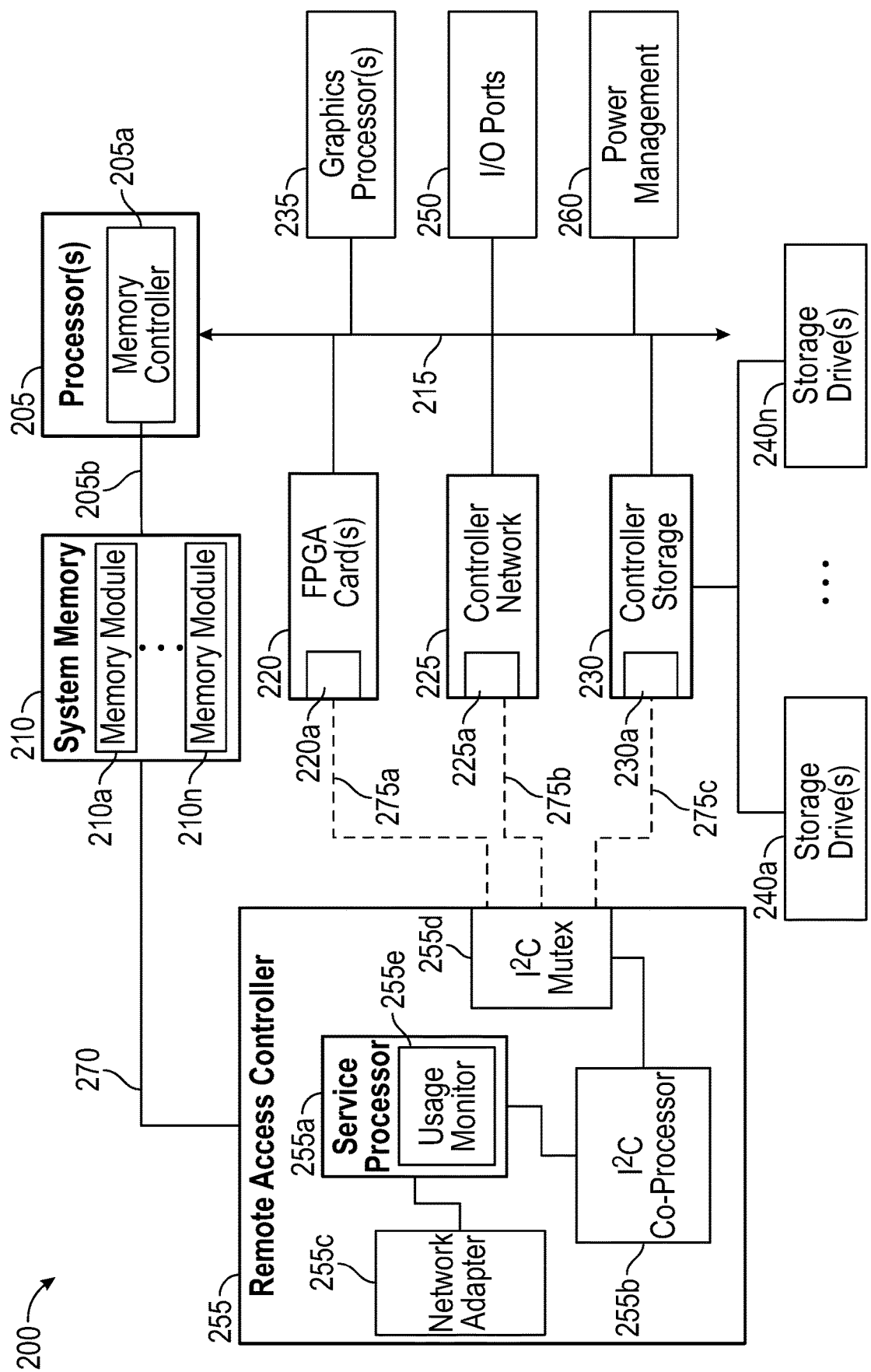
FIG. 2 is a block diagram illustrating certain components of an IHS that may be a component of a chassis and is configured, according to various embodiments, for extended support of deprecated hardware and software components of the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, in some cases as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks in support of specific computing solutions. A compute sled 105a-n may be a licensed component of a data center and may also operate using various licensed hardware and software systems.

As illustrated, each compute sled 105a-n includes a remote access controller (RAC) 110a-n. As described in additional detail with regard to FIG. 2, a remote access controller 110a-n provides capabilities for remote monitoring and management of compute sled 105a-n. In support of these monitoring and management functions, remote access controllers 110a-n may utilize both in-band and sideband (i.e., out-of-band) communications with various internal components of a compute sled 105a-n and with other components of chassis 100. Remote access controller 110a-n may collect sensor data, such as temperature sensor readings, from components of the chassis 100 in support of airflow cooling of the chassis 100 and the sleds 105a-n, 115a-n. Also as described in additional detail with regard to FIG. 2, remote access controllers 110a-n may support communications with chassis management controller 125 where these communications may report usage data that is based on monitored use of licensed hardware and software systems by a particular sled 105a-n, 115a-n.

A compute sled 105a-n may include one or more processors 135a-n that support specialized computing operations, such as high-speed computing, artificial intelligence processing, database operations, parallel processing, graphics operations, streaming multimedia and/or isolated execution spaces for virtualized environments. Using such specialized processor capabilities of a compute sled 105a-n, a chassis 100 may be adapted for a particular computing solution. As indicated in FIG. 1, a compute sled 105a-n may also include a usage monitor 165a-n. As described in additional detail with regard to FIGS. 2 and 3, an individual usage monitor 165a-n may monitor the use of licensed hardware and/or software systems of a compute sled 105a, and may additionally monitor use of certain features of these licensed systems. The usage data collected by the usage monitors 165a-n may be reported to the chassis management controller 125 for forwarding, where the usage data may be forwarded to an external system for use in evaluating the impact of the deprecation of a particular hardware and/or software system and in identifying features of that deprecated system that may separately supported.

In some embodiments, each compute sled 105a-n may include a storage controller that may be utilized to access storage drives that are accessible via chassis 100. Some of the individual storage controllers may provide support for RAID (Redundant Array of Independent Disks) configurations of logical and physical storage drives, such as storage drives provided by storage sleds 115a-n. In some embodiments, some or all of the individual storage controllers utilized by compute sleds 105a-n may be HBAs (Host Bus Adapters) that provide more limited capabilities in accessing physical storage drives provided via storage sleds 115a-n and/or via SAS expander 150.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n may include a remote access controller (RAC) 120a-n. Remote access controllers 120a-n may provide capabilities for remote monitoring and management of storage sleds 115a-n in a similar manner to the remote access controllers 110a-n included in compute sleds 105a-n. As described with regard to compute sleds 105a-n, the remote access controller 120a-n of each storage sled 115a-n may include a usage monitor 175a used to monitor the use of licensed hardware and/or software systems of a storage sled 105a-n, and may additionally monitor use of certain features of these licensed systems. The usage data collected by the usage monitors 175a-n may be reported to the chassis management controller 125 for forwarding, where the usage data may be forwarded to an external system for use in evaluating the impact of the deprecation of a particular system and in identifying features of that deprecated system that may separately supported.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a data center in which chassis 100 is installed. Such additional storage resources 155 may also be remotely located from chassis 100.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. In some embodiments, network controllers 140 may be replaceable components that include capabilities that support certain computing solutions, such as network controllers 140 that interface directly with network controllers from other chassis in support of clustered processing capabilities that utilize resources from multiple chassis.

Chassis 100 may also include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. In such embodiments, power supply unit 135 is a replaceable component that may be used in support of certain computing solutions.

Chassis 100 may also include various I/O controllers 140 that may support various I/O ports, such as USB ports that may be used to support keyboard and mouse inputs and/or video display capabilities. Such I/O controllers 145 may be utilized by a chassis management controller 125 to support various KVM (Keyboard, Video and Mouse) 125a capabilities that provide administrators with the ability to interface with the chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

As described, components of chassis 100 such as compute sleds 105a-n and storage sleds 115a-n may include usage monitoring 165a-n, 175a-n capabilities that may collect information regarding the usage of licensed systems and features of those licensed systems. Chassis management controller 125 may similarly include a usage monitor 125c that tracks usage information for some chassis systems that may be licensed. For instance, in some instances, aspects of power supply unit 135 and network controller 140 may utilize licensed software and hardware systems. The usage monitor 125c of the chassis management controller 125 may query such components in collecting usage data regarding licensed features of these components.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs. In the illustrative embodiment of FIG. 2, IHS 200 may be a computing component, such as compute sled 105a-n, that is configured to share infrastructure resources provided by a chassis 100 in support of specific computing solutions.

The IHS 200 of FIG. 2 may be a compute sled, such as compute sleds 105a-n of FIG. 1, that may be installed within a chassis, that may in turn be installed within a rack. Accordingly, IHS 200 may be comprised within a large system of similarly configured IHSs that may be housed within the same chassis, rack and/or datacenter. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one, some or all processor(s) 205 may be graphics processing units (GPUs). In some embodiments, one, some or all processor(s) 205 may be specialized processors, such as artificial intelligence processors or processor adapted to support high-throughput parallel processing computations. As described, such specialized adaptations of IHS 200 may be used to implement specific computing solutions support by the chassis in which IHS 200 is installed.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components. In certain embodiments, the I/O ports 250 may provide couplings to the backplane of the chassis in which the IHS 200 is installed.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. In some embodiments, network controller 225 may collect and report certain usage information to the usage monitor 255e of the remote access controller 255. For example, network controller 225 may collect and report usage data regarding use of the network controller 225, such as the number of a specific type of network operation performed by the network controller 225. As illustrated, network controller 225 may report such usage information to the remote access controller 255 via an out-of-band signaling pathway that is independent of the operating system of the IHS 200.

Processor(s) 205 may also be coupled to a power management unit 260 that may interface with the power system unit 135 of the chassis 100 in which an IHS 200, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGA cards 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200. In certain embodiments, such specialized functions supported by an FPGA card 220 may be utilized by IHS 200 in support of certain computing solutions. In some embodiments, FPGA 220 may collect and report certain usage information to the usage monitor 255e of the remote access controller 255. For example, an FPGA 220 may collect and report usage data regarding overall use of the FPGA 220, such as the number of operations performed by the FPGA 220 or such as an amount of processing time by FPGA 220. In certain embodiments, FPGA 220 may also track usage data for certain features of the FPGA, such as the number of times a specific capability for which an FPGA has been programmed is actually used. For example, FPGA 220 may collect information regarding use of a specific image processing or artificial intelligence function that is implemented by the FPGA. As illustrated, FPGA 220 may report such usage information to the remote access controller 255 via an out-of-band signaling pathway that is independent of the operating system of the IHS 200.

IHS 200 may also support one or more storage controllers 230 that may be utilized to provide access to virtual storage configurations. For instance, storage controller 230 may provide support for RAID (Redundant Array of Independent Disks) configurations of storage devices 240a-n, such as storage drives provided by storage sleds 115a-n and/or JBOD 155 of FIG. 1. In some embodiments, storage controller 230 may be an HBA (Host Bus Adapter). In some embodiments, storage controllers 230 may also collect and report certain usage information to the usage monitor 255e of the remote access controller 255. For example, a storage controller 230 may collect and report usage data regarding overall use of the storage controller 230, such as the number of storage operations performed by the storage controller 230. In certain embodiments, storage controller 230 may also track usage data for specific features of the storage controller's operation. Illustrative examples of such features include the number of times a specific RAID operation has been performed, the number of storage operations involving a particular storage sled or other storage location 240a-n, the number of storage operations, and the number of operations involving a particular computing solution, such as specific operations in support of a data mining solution. Storage controller 230 may report such usage information to the remote access controller 255 via an out-of-band signaling pathway that is independent of the operating system of the IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In some embodiments, BIOS instructions may be used to collect and report certain usage information to the usage monitor 255e of the remote access controller 255. For example, BIOS may collect and report usage data regarding the use of particular hardware components. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various devices 220, 225, 230 of an IHS via a sideband interface. In such embodiments, the messages in support of the monitoring and management function may be implemented using MCTP (Management Component Transport Protocol) that may be transmitted using I2C sideband bus connection 275a-c established with each of the respective managed devices 220, 225, 230. As illustrated, the managed hardware components of the IHS 200, such as FPGA cards 220, network controller 225 and storage controller 230, are coupled to the IHS processor(s) 205 via an in-line bus 215, such as a PCIe root complex, that is separate from the I2C sideband bus connection 275a-c.

In certain embodiments, the service processor 255a of remote access controller 255 may rely on an I2C co-processor 255b to implement sideband I2C communications between the remote access controller 255 and managed components 220, 225, 230 of the IHS. The I2C co-processor 255b may be a specialized co-processor or micro-controller that is configured to interface via a sideband I2C bus interface with the managed hardware components 220, 225, 230 of IHS. In some embodiments, the I2C co-processor 255b may be an integrated component of the service processor 255a, such as a peripheral system-on-chip feature that may be provided by the service processor 255a. Each I2C bus 275a-c is illustrated as single line in FIG. 2. However, each I2C bus 275a-c may be comprised of a clock line and data line that couple the remote access controller 255 to I2C endpoints 220a, 225a, 230a.

As illustrated, the I2C co-processor 255b may interface with the individual managed devices 220, 225 and 230 via individual sideband I2C buses 275a-c selected through the operation of an I2C multiplexer 255d. Via switching operations by the I2C multiplexer 255d, a sideband bus connection 275a-c may be established by a direct coupling between the I2C co-processor 255b and an individual managed device 220, 225 or 230.

In providing sideband management capabilities, the I2C co-processor 255b may each interoperate with corresponding endpoint I2C controllers 220a, 225a, 230a that implement the I2C communications of the respective managed devices 220, 225, 230. The endpoint I2C controllers 220a, 225a, 230a may be implemented as a dedicated microcontroller for communicating sideband I2C messages with the remote access controller 255, or endpoint I2C controllers 220a, 225a, 230a may be integrated SoC functions of a processor of the respective managed device endpoints 220, 225, 230.

As described, a compute node such as IHS 200 may include a usage monitor 255e that collects and monitors usage information for hardware and software systems of IHS 200. In some embodiments, a usage monitor 255e may be implemented as a process of remote access controller 255, where the usage data from components 220, 225, 230 may be collected by service processor 255a via the out-of-band management connections 275a-c supported by I2C co-processor 255b. The collected usage data may then be reported to the chassis management controller via a connection supported by the network adapter 255c of the remote access controller 255.

In some embodiments, the usage monitor 255e of remote access controller 255 may periodically query managed components 220, 225, 230 in order to collect usage data from these components. In some embodiments, usage monitor 255e may provide managed components 220, 225, 230 with instructions regarding the data to be collected. In some embodiments, usage monitor 255e may store collected usage data until prompted to provide this data by a chassis management controller or by an administrative process. In some embodiments, a request to provide all or a particular subset of collected usage data may be sent to usage monitor 255e upon notification that a component of the data center has been deprecated.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
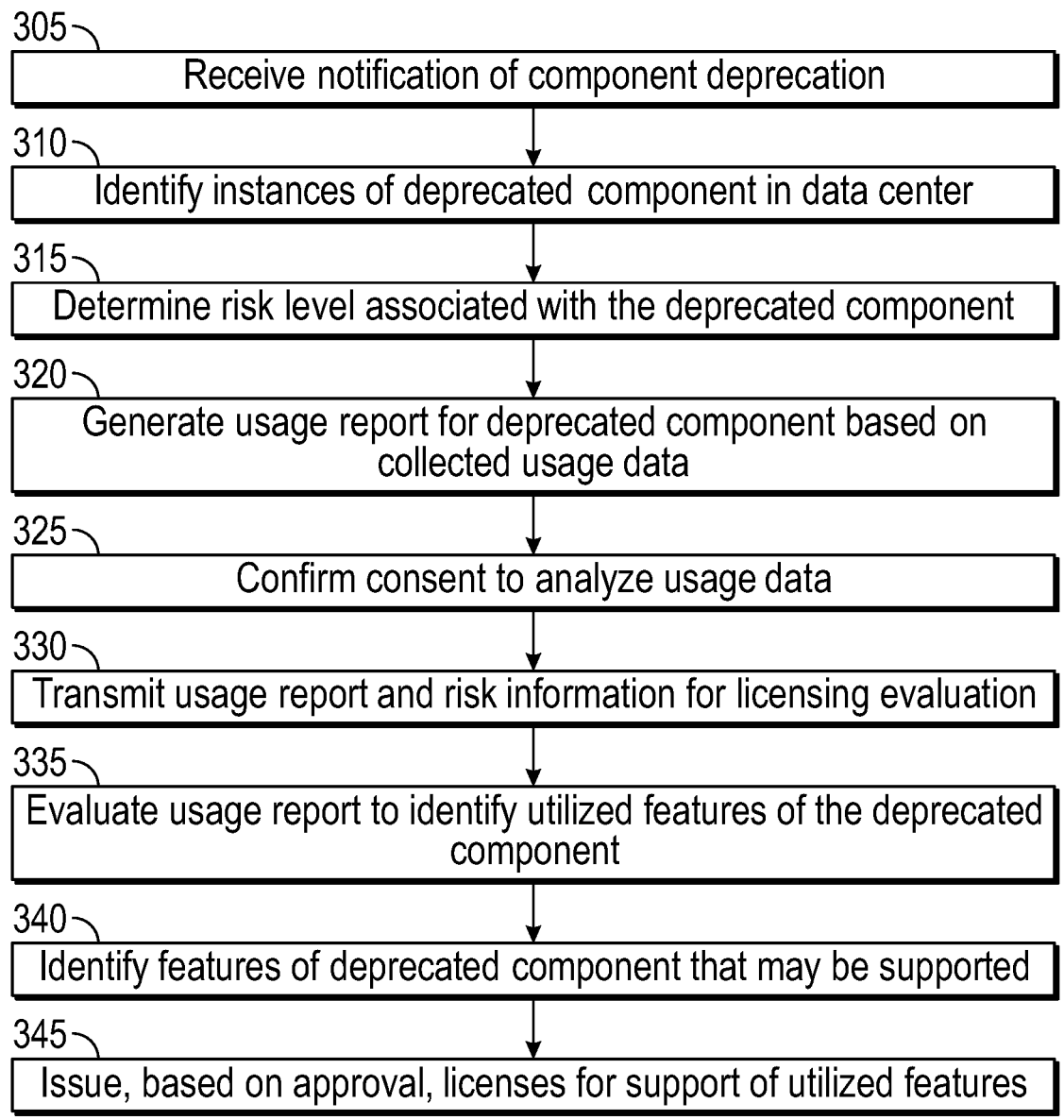
FIG. 3 is a flowchart diagram illustrating certain steps of a process, according to some embodiments, for extended support of deprecated hardware and software components of an enterprise computing system.

FIG. 3 is a flowchart diagram illustrating certain steps of a process, according to some embodiments, for extended support of deprecated component of an enterprise computing system. The illustrated embodiment begins at block 305 with the notification of the deprecation of a component that may be operating within a data center. In various scenarios, the deprecated component may be a hardware system, such as a compute sled, storage sled or an FPGA or storage controller that is installed within a compute sled. In other scenarios, a deprecated component may be a software system, such as a database application or a security protocol. In other scenarios, a deprecated component may be a computing solution that may include both hardware and software elements, such as an e-commerce or artificial intelligence system. In some scenarios, the notification of the deprecation of a component may be received by an administrative tool in use by a datacenter.

At block 310, the administrative tool may be configured to identify instances of a deprecated component within a data center. In some embodiments, the administrative tool may identify instances of the deprecated component by querying the individual chassis within the data center. In some embodiments, a chassis may operate a license management service, such as license management capability 125d of FIG. 1, that tracks the licensed hardware and software system operating on a particular chassis. In some embodiments, the administrative tool may refer to a database or service that provides information regarding the hardware and software systems that have been licensed for use within a data center. At block 315, a risk level may be determined for the deprecated component, where the risk level may characterize the risk associated with eliminating use of the deprecated component. In various embodiments, a risk level associated with a deprecated component may be determined based on factors such as the function of the deprecated component (a security application may be associated with a higher risk level than a storage drive capability), estimates of the time required to eliminate use of deprecated component and the number of other components that depend on the operation of the deprecated component. In some embodiments, risk level determinations may be provided for specific features of deprecated component. For instance, a risk level determination may be provided for a specific storage operation supported by a licensed storage controller. Embodiments may determine various risk levels that are posed by a deprecated component, such as the risk posed to the operations of individual IHSs, the risk to the operation of a chassis, the risk to a logical groups of IHSs and/or a risk to an entire data center.

As described with regard to FIGS. 1 and 2, various components of a data center may be configured to collect data regarding the use of individual hardware and software systems. For instance, a remote access controller of an IHS may be instrumented with instructions for collecting usage information for licensed hardware and software of the IHS. As described in one example, a remote access controller of an IHS may query a storage controller to collect data regarding use of a licensed data storage protocol or of a particular storage location that is part of a licensed storage solution. The remote access controller may similarly query an FPGA of an IHS in order to collect data regarding use of FPGA itself and/or regarding use of specific capabilities of an FPGA, such as use of a particular processing capability supported by an FPGA. The remote access controller may query a network controller in order to collect data regarding use of a licensed communications protocol or of a security protocol. In certain instances, a remote access controller may also report usage data for a particular remote administration capability, such as a KVM capability, supported by the remote access controller. As described, a chassis may similarly collect usage information for licensed hardware and software systems of the chassis. For instance, a usage monitor of a chassis management controller may monitor usage of particular compute sleds and storage sleds that are licensed for use. The usage monitor of the chassis management controller may also monitor usage of certain chassis capabilities such as use of a network protocol, the use of capabilities of a power supply unit and the use of particular KVM capabilities.

At block 320, the usage monitors associated with instances of deprecated components within a datacenter maybe queried in order to initiate collection of usage data. Once usage data for a deprecated component has been identified, at block 325, authorization for collection and analysis of this usage data may be confirmed. If consent is confirmed, the usage data may be collected and reported for analysis, at block 330, by the individual usage monitors that have been identified as associated with instances of a deprecated component. In certain embodiments, a chassis management controller may be configured to collect usage reports from all usage monitors operating on chassis and further configured to relay collecting usage reports for analysis. In certain embodiments, the determined risk information associated with the deprecated component may be included in the transmission of usage data.

Collected usage data may be evaluated, at block 335, in order to evaluate whether reported usage of a deprecated component warrants consideration for seeking further licensed use of the component, or of features of the deprecated component. As described, usage monitors in operation with a data center may collect data pertaining to use of licensed hardware and software systems. For instance, a remote access controller may collect and report usage data for a licensed storage controller. Also as describe, the licensed storage controller may be instrumented to collect usage information regarding use of specific features of the storage controller, such as use of a specific RAID operation. Through evaluation of such data, specific features of a deprecated system may be identified, where these features are those that are actually utilized. For instance, analysis of the usage data collected for the deprecated storage controller may indicate that only a limited set of RAID operations are actually in use by that storage controller. The other licensed capabilities of the storage controller may not be actually used, or very rarely used. In some embodiments, further evaluation of the deprecated component continues only if the usage data indicates usage of the deprecated component, or of a feature of the deprecated component, above a use threshold. For deprecated components or for features of deprecated components, threshold may be specified to decline consideration for extended support for components and/or features that are used infrequently. The described risk level information may provide another risk level threshold for identifying deprecated products for which consideration for extended support should be declined.

Once features of the deprecated component that are actually used have been identified, at block 340, any of these features that may be individually licensed, or licensed in another manner, may be identified. In some instances, features that may be licensed through searching of an inventory of systems that are licensed, or available for licensed. For instance, if a particular RAID capability of a deprecated storage controller is actually used, queries to an inventory of supported systems may indicate that such RAID capabilities may be separately licensed, or licensed via an alternate storage solution. In some embodiments, the inventory of supported systems may be further evaluated in order to determine whether use of this alternate storage solution is presently licensed by a particular data center. In another example, if a particular networking capability of a deprecated network controller is actually used, queries may indicate that this specific network capability is still supported. In another example, if a particular artificial intelligence operation implemented by a deprecate compute node is actually used, queries may indicate that this artificial intelligence operation may be supported by a different type of compute node that is in use within the data center.

If any such features of a deprecated component are identified, at block 345, an offer for licensed use of the identified feature may be extended to a data center administrator. In some instances, the licensing of such features may be automatically enacted based on pre-existing agreements with data center operators. Such agreements may provide authorization to license use of features of a deprecated product, where such authorization for automatic licensing may be subject to restrictions regarding the cost for such licensing and/or the risk level associated with the deprecated component. As described, usage information for a deprecated component may be supplemented with a risk associated with loss of use of the deprecated component and, in some cases, with the loss of a particular feature of a deprecated component. In some instances, loss of a specific feature of a deprecated component may preset a risk above a specified risk threshold that triggers automated extension of a license for use of the specific feature. In some instances, minimal technical support may be provided for use of the specific feature, but authorized use may be extended. In this manner, upon deprecation of a component of a data center, features of that component that are actually utilized may be licensed separately or as part of another solution, thus providing an ability to adapt monolithic licenses to finer-grained licenses for features that are actually in use.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for managing a plurality of IHSs (Information Handling Systems), the method comprising:
   receiving, from a datacenter administration tool providing management of the plurality of IHSs that are deployed within a datacenter, a notification of a deprecated component;
   identifying a first IHS of the plurality of IHSs that are deployed within the datacenter that includes the deprecated component;
   collecting usage information for the deprecated component by the first IHS, wherein the usage information is collected by a remote access controller of the first IHS that provides out-of-band management of a plurality of hardware components of the first IHS;
   based on the collected usage information for the deprecated component, determining a usage for a first feature of the deprecated component; and
   based on the usage of the identified first feature, providing a recommendation whether to extend support for the first feature of the deprecated component.

2. The method of claim 1, wherein the first IHS is identified as including the deprecated component based on a query by the datacenter administration tool to a chassis in which the first IHS is installed.

3. The method of claim 1, wherein the remote access controller collects the usage information from the plurality of hardware components of the IHS via an out-of-band management coupling between the remote access controller and each of the plurality of hardware component.

4. The method of claim 1, further comprising:
   receiving a risk level for the deprecated component; and
   recommending an extension of a license for use of the first feature when the risk level for the deprecated component is above a risk threshold.

5. The method of claim 3, wherein the plurality of hardware components providing usage information via the out-of-band management coupling with the remote access controller comprises a storage controller of the first IHS, and wherein the first feature of the deprecated component comprises a RAID (Redundant Array of Inexpensive Disks) operation implemented by the storage controller.

6. The method of claim 1, wherein the usage information is collected from the remote access controller of the first IHS by a chassis management controller that manages a first portion of the plurality of IHSs that are housed within a first chassis in which the first IHS is installed.

7. The method of claim 3, wherein the plurality of hardware components providing usage information via the out-of-band management coupling with the remote access controller comprises a FPGA (Field Programmable Gate Array) of the first IHS, and wherein the first feature of the of the deprecated component comprises a processing capability implemented by the FPGA.

8. A remote access controller configured as a component of an IHS (Information Handling Systems), the remote access controller comprising:
   a plurality of out-of-band management coupling, each coupling supported management of a respective hardware component of the IHS by the remote access controller;
   one or more processors; and
   a memory device coupled to the one or more processors, the memory device storing computer-readable instructions that, upon execution by the one or more processors, cause the remote access controller to:

receive a notification of a deprecated component from a datacenter administration tool providing management of a plurality of IHSs that are deployed within a datacenter;

identify an instance of the deprecated component within the IHS;

collect usage information for the deprecated component identified within the IHS, wherein the usage information is collected via the out-of-band management couplings supporting the hardware components of the IHS;

based on the collected usage information for the deprecated component, determine a usage for a first feature of the deprecated component;

based on the usage of the identified first feature, provide a recommendation whether to extend support for the first feature of the deprecated component.

9. The remote access controller of claim 8, wherein the remote access controller comprises a usage monitor that utilizes the out-of-band management couplings to collect the usage information for the deprecated component.

10. The remote access controller of claim 9, wherein the usage monitor of the remote access controller reports the collected usage information to a chassis management controller of a chassis in which the IHS is installed.

11. The remote access controller of claim 10, wherein the collected usage information is reported to the chassis management controller via a network adapter of the remote access controller.

12. The remote access controller of claim 8, wherein the plurality of hardware components providing usage information via the out-of-band management coupling with the remote access controller comprises a storage controller of the IHS, and wherein the first feature of the of the deprecated component comprises a RAID (Redundant Array of Inexpensive Disks) operation implemented by the storage controller.

13. The remote access controller of claim 8, wherein the plurality of hardware components providing usage information via the out-of-band management coupling with the remote access controller comprises a FPGA (Field Programmable Gate Array) of the first IHS, and wherein the first feature of the of the deprecated component comprises a processing capability implemented by the FPGA.

14. A memory device coupled to one or more processors, wherein the memory device stores computer-readable instructions that, upon execution by the one or more processors, cause the processors to:

receive, from a datacenter administration tool providing management of the plurality of IHSs that are deployed within a datacenter, a notification of a deprecated component within the plurality of IHSs (Information Handling Systems) deployed within the datacenter;

identify a first IHS of the plurality of IHSs that are deployed within the datacenter that includes the deprecated component;

collect usage information for the instances of the deprecated component identified within the plurality of IHSs, wherein the usage information is collected by a remote access controller of the first IHS that provides out-of-band management of a plurality of hardware components of the first IHS;

based on the collected usage information for the deprecated component, determine a usage for a first feature of the deprecated component; and based on the usage of the identified first feature, provide a recommendation whether to extend support for the deprecated component.

15. The memory device of claim 14, wherein the first IHS is identified as including the deprecated component based on a query by the datacenter administration tool to a chassis in which the first IHS is installed.

16. The memory device of claim 14, wherein the remote access controller collects the usage information from the plurality of hardware components of the first IHS via an out-of-band management coupling between the remote access controller and each of the plurality of hardware component.

17. The memory device of claim 14, wherein the plurality of hardware components providing usage information via the out-of-band management coupling with the remote access controller comprises a FPGA (Field Programmable Gate Array) of the first IHS, and wherein the first feature of the of the deprecated component comprises a processing capability implemented by the FPGA.

18. The memory device of claim 14, wherein execution of the instructions further causes the processors to:

receive a risk level for the deprecated component; and recommend an extension of support for the first feature when the risk level for the deprecated component is above a risk threshold.

19. The memory device of claim 14, wherein the usage information is collected from the remote access controller of the first IHS by a chassis management controller that manages a chassis in which the first IHS is installed.

20. The memory device of claim 14, wherein the plurality of hardware components providing usage information via the out-of-band management coupling with the remote access controller comprises a storage controller of the IHS, and wherein the first feature of the of the deprecated component comprises a RAID (Redundant Array of Inexpensive Disks) operation implemented by the storage controller.

* * * * *